US007559526B2

(12) United States Patent
Kitagawa et al.

(10) Patent No.: US 7,559,526 B2
(45) Date of Patent: Jul. 14, 2009

(54) FUEL INJECTION VALVE

(75) Inventors: Kazunori Kitagawa, Tokyo (JP); Yoshihiko Onishi, Tokyo (JP)

(73) Assignee: Mitsubishi Electric Corp., Tokyo (JP)

( * ) Notice: Subject to any disclaimer, the term of this patent is extended or adjusted under 35 U.S.C. 154(b) by 246 days.

(21) Appl. No.: 11/493,701

(22) Filed: Jul. 27, 2006

(65) Prior Publication Data

US 2007/0252100 A1 Nov. 1, 2007

(30) Foreign Application Priority Data

Apr. 12, 2006 (JP) ............................ 2006-109786

(51) Int. Cl.
*F16K 31/12* (2006.01)

(52) U.S. Cl. ...................... 251/53; 251/129.21; 251/54; 239/585.1

(58) Field of Classification Search ... 239/585.1–585.5; 251/50, 53, 54, 129.21, 129.15
See application file for complete search history.

(56) References Cited

U.S. PATENT DOCUMENTS 3,772,541 A * 11/1973 Campagnuolo et al. ..... 470/141
4,984,549 A * 1/1991 Mesenich ................... 123/472
5,088,467 A * 2/1992 Mesenich ................... 123/531
5,749,527 A * 5/1998 Fujikawa et al. ......... 239/585.3
6,173,915 B1 * 1/2001 Cohen et al. ............. 239/585.1
7,086,606 B2 * 8/2006 Brooks et al. .................. 239/5
2003/0155448 A1 * 8/2003 Reiter et al. ............ 239/585.1
2004/0201148 A1 * 10/2004 Kwan et al. ................. 267/137
2006/0113503 A1 * 6/2006 Mennicken et al. .... 251/129.15

FOREIGN PATENT DOCUMENTS

JP 59-73573 U 5/1984
JP 09-273457 A 10/1997
JP 2002-528672 A 9/2002
JP 2004-183601 A 7/2004
JP 3723800 B2 9/2005
WO WO 00/25018 A1 5/2000

* cited by examiner

*Primary Examiner*—John K Fristoe, Jr.
*Assistant Examiner*—Marina Tietjen
(74) *Attorney, Agent, or Firm*—Sughrue Mion, PLLC

(57) ABSTRACT

A fuel injection valve comprises: a solenoid unit including a core, an armature and a coil; and a valve unit including a valve element connected to the armature to travel therewith, and a valve seat that regulates a movement in valve closing direction of the valve element, and is open and closed by the valve element separating from or coming in contact with the valve seat, and a stopper for regulating a movement in valve opening direction of the valve element, said valve unit being connected to the solenoid unit. There is provided a cavity that communicates with a gap formed between the core and the armature in opposition, and the cavity forms a resonator for suppressing bounce of the valve element. In spite of the simple structure, it is possible to effectively suppress bounce of the valve element that takes place at the time of valve opening/closing.

8 Claims, 6 Drawing Sheets

ENLARGED G PORTION

FUEL INJECTION VALVE

BACKGROUND OF THE INVENTION

1. Field of the Invention

The present invention relates to a fuel injection valve for a fuel injection equipment of an internal combustion engine and, more particularly, to structure of a fuel injection valve capable of suppressing bounce at the time of opening and closing a needle (valve element).

2. Description of the Related Art

To extend the range of combustion control in an internal combustion engine, improvement in flow controllability of a fuel injection valve has been conventionally required.

As a method of extending the range of small flow rates of the controllable quantity of flow of fuel, bounce suppression of a needle (valve element) is known.

Due to the bounce of the needle, since the needle is moved in valve closing direction at the time of vale opening and is moved in valve opening direction at the time of valve closing, a problem exists, for example, in that the minimum driving time period of the needle is increased at the time of valve opening, and the minimum flow rate is increased at the time of valve closing. The adjustment of flow rates of fuel can be made depending on length of pulse signals (valve opening time period signals) to be transmitted to a fuel injection valve.

However, in a period of the unstable lift of the needle (i.e., the travel in valve opening direction of a needle) owing to the bounce of the needle at the time of valve opening, it is necessary to transmit valve opening signals at all times thus to regulate the minimum flow rate.

Further, when the bounce of the needle occurs at the time of valve closing, although it is a short time period, the valve is open again, after it has been closed, to inject excess fuel, resulting in increase of the minimum flow rate of fuel to be injected.

Furthermore, owing to the bounce of the needle, fuel is injected (secondary injection) from a gap between the needle and a valve seat.

Since this secondary injection is an uncontrollable injection, a problem exists in that abnormal combustion occurs in a cylinder of an engine, and that deposits are adhered to a fuel injection valve.

Additionally, those deposits are made by products of carbon particles and tar being produced by the combustion of fuel, and the carbon particles being adhered to the valve with tar. When deposits are adhered to an injection port of fuel, there arises a further problem such as a smaller cross-section of injection port resulting in a smaller flow rate of fuel.

Since the secondary injection is a powerless injection, fuel is likely to adhere to the injection port and to bring a factor of increase of production of the deposits.

Thus, in the field of fuel injection valves for injecting fuel to an internal combustion engine, several attempts of suppressing bounce that occurs at the time of valve opening/closing of a needle (valve element) have been heretofore proposed.

For example, the published Japanese translation of a PCT application No. 528672/2002 proposes a method, in which a buffer spring (specifically, Belleville spring annularly surrounding a needle) is inserted between an armature (moving iron core) and a stopper to cause the buffer spring to absorb the bouncing force that takes place due to inertial force of the needle at the time of valve closing of the needle, thereby suppressing the bounce of the needle.

However, the method of bounce suppression of a needle that is proposed in the published Japanese translation of a PCT application No. 528672/2002 has several problems as follows.

Reliability assurance of the sliding portion between the needle and the armature is required.

A buffer spring and members for fixing the buffer spring are added, so that the number of parts is increased, as well as the structure comes to be complicated.

Since suppression effects of bounce depend on the weight of the armature and the buffer spring at the time of valve closing, and on the weight of the needle and the buffer spring at the time of valve opening, in the case where the weight of the armature and the weight of the needle are different, the setting range of bounce suppression effects is restricted.

Since an inertial force of the needle is absorbed by the needle and the buffer spring, the needle is lifted not less than a travel amount having been set, resulting in worse controllability of flow rate.

Further, the Japanese Patent No. 3723800 (Patent Document 2) proposes another method, in which there are provided a passage that communicates with an air gap formed between an armature and a core (fixed iron core) , and a volume chamber that communicates with the air gap via this passage; and the mentioned passage and volume chamber are set to be of such configuration dimension as to phase-invert pressure waves that occur in the air gap to return it to the air gap, and to make the pressure in this air gap larger, thereby suppressing the bounce of a needle.

In addition, the Helmholtz resonator is formed with the mentioned passage and pressure chamber.

However, the mentioned bounce suppression method of the needle that is proposed in the Japanese Patent No. 3723800 has problems as follows.

To have the configuration of a fuel injection valve giving most bounce suppression effects, it is necessary that a pressure pulsation period of the air gap between the armature and the core is coincident with a resonance frequency of the resonator.

Therefore, by measuring pressure pulsation of the air gap between the armature and the core, the configuration of the resonator can be set in accordance with the pulsation period thereof.

Actually, between the air gap between the armature and core, and the resonator, there is a further air gap (side gap) between the armature and a holder.

Accordingly, the period of pressure pulsation having occurred in the air gap between the armature and the core is changed at the time point of reaching the resonator, thus making it hard to be the optimum design.

Since an oil path (fuel passage) facing a resonator is formed of two air gaps of one air gap between the core and armature and another air gap (side gap) between the armature and holder, a distance through which pressure is transmitted comes to be longer. Thus, the sufficient bounce suppression effects cannot be achieved.

Moreover, as a fuel pressure in use becomes higher, the mentioned disadvantage takes place more considerably.

The resonator is disposed in the holder, so that the mechanical strength (pressure resistant properties) of the holder comes to be lower.

Consequently, it is necessary to prevent the worse pressure resistance, resulting in a larger diameter of holder, upsizing and increase in cost of the fuel injection valve.

As described above, several attempts for bounce suppression have been heretofore proposed. However, it is a recent trend that the load a fuel pressure imposed on a needle is increased due to, e.g., higher pressure of the fuel in use, wherebya problem exists in that the sufficient effect cannot be obtained with measures having been proposed.

Furthermore, it is necessary to insert a buffer spring (Belleville spring) between the armature and stopper, or to provide a pressure chamber at a place that communicates with the air gap between the core and armature, and the air gap between the armature and holder to form a resonator. Thus, a further problem exists in that the number of parts is increased, and that the structure is complicated.

SUMMARY OF THE INVENTION

The present invention was made to solve the above-described problems, and has an object of providing a fuel injection valve in which a resonator is directly formed as a simple construction at the face in an air gap between a core and an armature, thereby enabling to effectively suppress bounce of a needle that occurs at the time of valve opening/closing without increase in the number of parts, and without complicated structure.

A fuel injection valve according to the invention comprises: a solenoid unit that includes a core, an armature and a coil; and a valve unit that includes a valve element connected to the mentioned armature to travel therewith, a valve seat that regulates a movement in a valve closing direction of the mentioned valve element, as well as is open and closed by the mentioned valve element separating from or coming in contact with the valve seat, and a stopper for regulating a movement in a valve opening direction of the mentioned valve element, said valve unit being connected to the mentioned solenoid unit. In this fuel injection valve, there is provided a cavity that communicates with a gap formed between the mentioned core and said armature in opposition, and the mentioned cavity forms a resonator for suppressing bounce of the mentioned valve element.

As a result, according to the invention, since a resonator for suppressing bounce of a valve element (needle) is directly formed as a simple construction at the gap formed between the core and the armature, it becomes possible to achieve high responsiveness of a fuel injection valve, and to effectively suppress the bounce of a needle that occurs at the time of valve opening/closing despite the simple construction.

The foregoing and other objects, features, aspects and advantages of the present invention will become more apparent from the following detailed description of the present invention when taken in conjunction with the accompanying drawings.

DETAILED DESCRIPTION OF THE INVENTION

Figure 1:
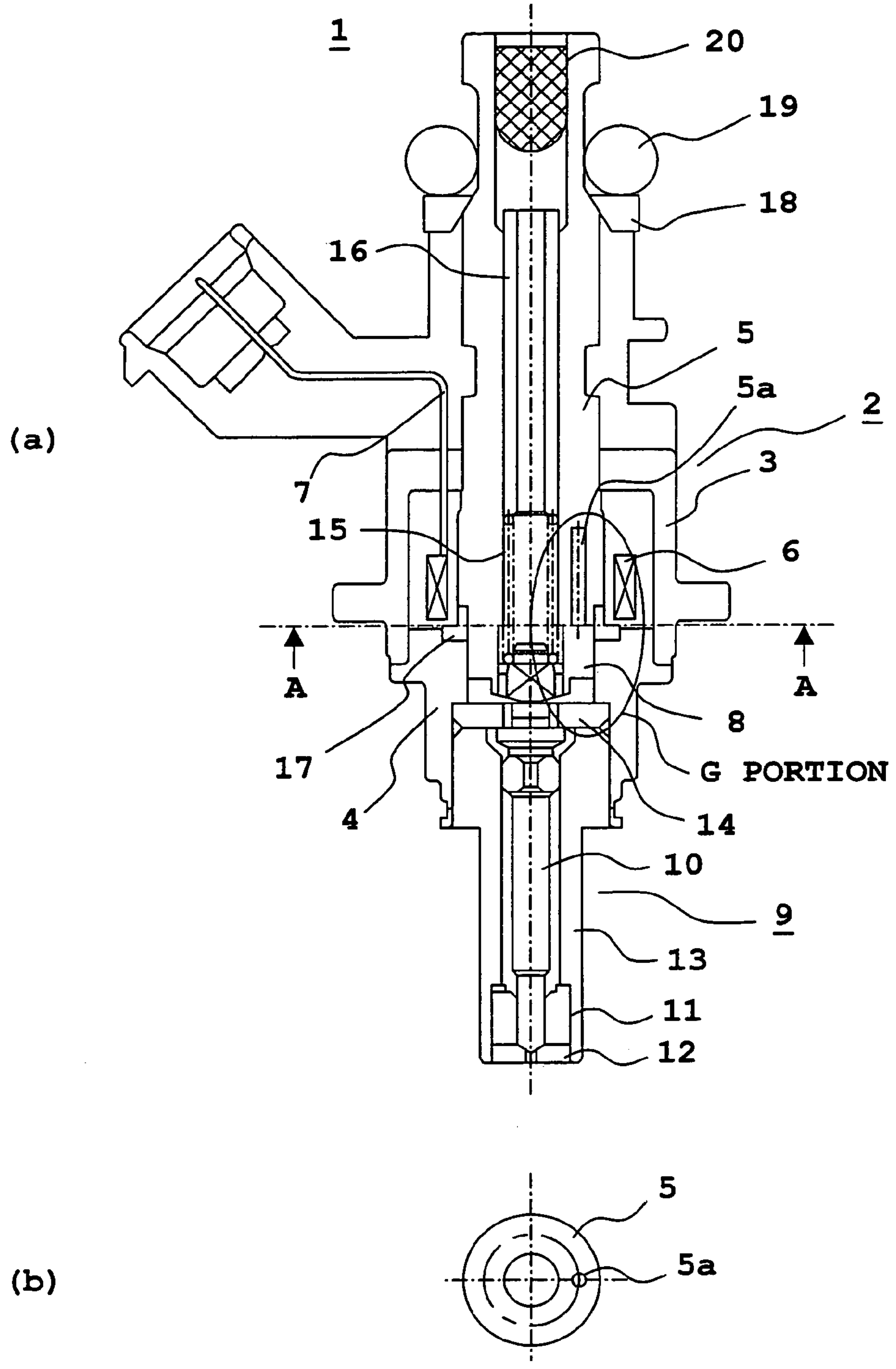
FIGS. 1(*a*) and (*b*) are views each showing a structure of a fuel injection valve according to a first preferred embodiment of the present invention.

Now referring to the drawings, several preferred embodiments according to the present invention are hereinafter described.

Additionally, throughout the drawings, the same reference numerals indicate the same or like parts.

Embodiment 1

FIG. 1 show a structure of a fuel injection valve according to a first embodiment of the invention, and in which FIG. 1(*a*) shows the entire structure of the fuel injection valve according to the first embodiment, and FIG. 1(*b*) shows an end face of a core taken along line A-A of FIG. 1(*a*).

In the drawings, reference numeral 1 designates a fuel injection valve, and the fuel injection valve 1 comprises a solenoid unit 2 and a valve unit 9.

The solenoid unit 2 comprises a housing 3, a holder 4, a core 5 being a fixed iron core, a coil 6, a terminal 7, and an armature being a moving iron core.

In addition, the core 5, the coil 6, and the armature 8 form a magnetic circuit of the solenoid unit 2.

The valve unit 9 is constructed such that the armature 8 and a needle (valve element) 10 including a bearing and a seat portion are fixed together by welding, and is slidably mounted on a body (valve body) 13 including a bearing 11 and a valve seat (seat) 12 toward the core 5.

Further, the end of the needle 10 is spherical, and this spherical end is seated on a taper portion of the valve seat 12, thereby sealing fuel.

In addition, the seat portion of the needle 10 is a spherical portion at the end to be in contact with the taper portion of the valve seat 12.

Furthermore, the holder 4 of the solenoid unit 2 and the body 13 of the valve unit 9 are fixed together by welding via a stopper 14 serving to regulate a lift amount of the needle 10.

In addition, the armature 8 and the needle 10 are pressed onto the valve seat 12 through a spring 15. Further, the spring force thereof is adjusted by means of a rod 16.

In the drawing, numeral 18 designates a seat of an O-ring 19 for sealing. Numeral 20 designates a filter for removing, e.g., dust in fuel to be fed from a fuel supply pipe.

Now, operations are described.

In response to a valve opening operation signal from a control controller, not shown, the coil 6 of the fuel injection valve 1 is excited to generate a magnetic flux at the magnetic circuit of the solenoid unit 2.

Thus, attraction is generated between the opposed faces of the core (fixed iron core) 5 and the armature (moving iron core) 8. At the time point of the attraction thereof being not less than a spring force of the spring 15, the core 5 attracts the armature 8. This attraction operation continues until the needle 10 comes in contact with the stopper 14.

At this time, a gap is formed between the needle 10 and the valve seat 12, and then fuel will be injected.

Next, in response to the valve closing operation signal from the control controller (not shown), there will be no magnetic flux that is generated at the magnetic circuit of the solenoid unit 2.

Spontaneously, the attraction having been generated at the armature 8 is eliminated, there will be no gap between the needle 10 and the valve seat 12, because the spring force provided by the spring 15 produces in valve-closed position, and then the fuel injection will be stopped.

Further, the amount of travel of the needle 10 is regulated by means of the stopper 14 at the time of valve opening, and by means of the valve seat 12 at the time of valve closing.

The fuel injection valve is required to have a high responsiveness at valve opening/closing operation in order to improve flow characteristics. Therefore, the attraction and spring force are set to be large.

Thus, the needle 10 runs against the stopper 14 or the valve seat 12 at high speed, and thus bounce (rebounding) of the needle 10 will occur at the time of valve opening/closing operation.

Collision energy to be composed of mass and collision speed of the armature 8 and the needle 10 and generated at this time comes to be higher. This collision energy comes to be a rebounding force to generate bounce of the needle 10.

Additionally, the armature 8 and the needle 10 are in fuel of the fuel injection valve, and are much affected by fuel pressure to be applied at the time of operation.

Armature 8 of a large outside diameter is especially susceptible to a fuel pressure.

In particular, it is a recent trend that devices suitable for high fuel pressure are required in order to improve performance, and thus it becomes necessary to take further measures against bounce.

In addition, a gap (generally referred to as an air gap) that is formed at the portion where the core 5 and the armature 8 are opposed, a space that is formed between the armature 8 and the stopper 14, and a fuel passage providing the communication between the mentioned gap and space are filled with fuel at all times even if the valve unit 9 is in valve opening/closing operation.

Now, the principle of bounce suppression is described.

Figure 2:
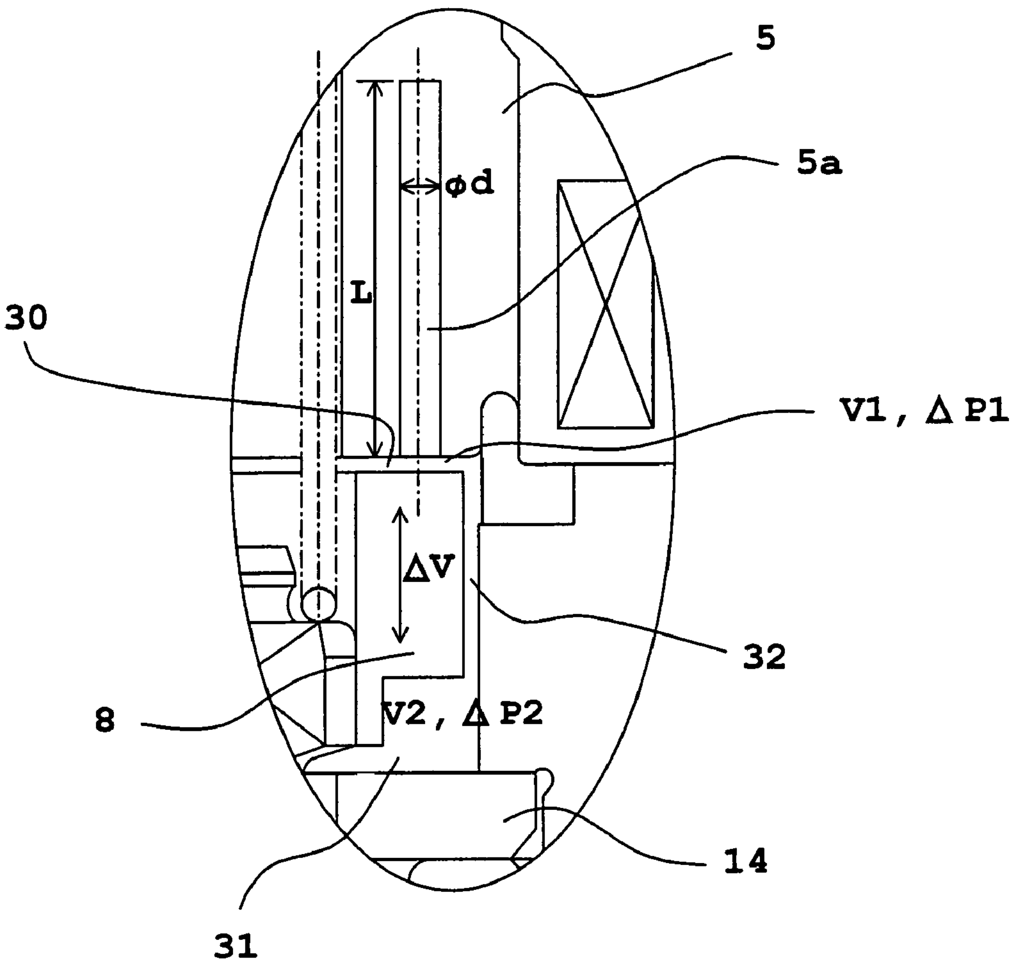
FIG. 2 is an enlarged view of G portion of FIG. 1 (a).

It is assumed herein that there is no tubular cavity acting as a resonator according to the invention shown in FIG. 1 or 2.

First, in the case of a normal fuel injection valve in which there is provided no resonator, pressure change that occurs at the front and back of the armature 8 by the valve opening/closing operation of the needle 10 will be discussed below.

When letting a volume of the gap formed at the portion where the core 5 and the armature 8 are opposed be V1, a volume of the space formed between the armature 8 and the stopper 14 be V2, the change in volume due to the lift (travel) of the needle 10 be ΔV, pressure changes be ΔP1 and ΔP2 respectively, and a volume elastic modulus of fuel K, then the instantaneous pressure changes that occur by the valve opening/closing operation of the needle 10 are respectively as follows:

$$\Delta P1=(\Delta V/V1)*K$$

$$\Delta P2=(\Delta V/V2)*K$$

where: "*" is a product.

However, in view of the structure of the fuel injection valve, V1≦V2, so that P1≧P2. This means that P1 (that is, pressure at the gap formed at the portion where the core 5 and the armature 8 are opposed) comes to have larger pressure change.

At the time of valve opening, since V1 is decreased only by ΔV, the pressure of the air gap that is formed at the portion where the core 5 and the armature 8 are opposed is increased only by ΔP1.

Further, since V2 is increased only by ΔV, the pressure at the space that is formed at the portion where the armature 8 and the stopper 14 are opposed is decreased only by ΔP2.

That is, the pressure at the gap (v1) above the armature 8 is increased, while the pressure at the space (v2) below the armature 8 being decreased, a force is exerted on the armature 8 in the valve closing direction. As a result, the bounce at the time of valve opening is made larger.

Likewise, at the time of valve closing, since V1 is increased only by ΔV, the pressure is decreased only by ΔP1.

Further, since V2 is decreased only by ΔV, the pressure is increased only by ΔP2.

That is, since the pressure at the gap (v1) above the armature 8 is decreased, while the pressure at the space (v2) below the armature 8 being increased, a force is exerted on the armature 8 in the valve opening direction. Thus, the bounce at the time of valve closing is made larger.

In addition, this state is an instantaneous state that takes place immediately after valve opening/valve closing, and the differential pressure will be eliminated in a short time.

The forces generated due to the pressure change that takes place shortly after valve opening/valve closing are found from, e.g., tests to make the bounce of the needle 10 larger. This tendency will be marked as a fuel pressure becomes higher.

On the contrary, by reducing the differential pressure that is generated due to this pressure change, it becomes possible to suppress the bounce of the needle 10.

The invention is characterized in that a cavity (for example, the below-described tubular cavity, being a drilled hole) acting as resonator is provided at the end faces of the core 5 or the armature 8 that form the gap therebetween (i.e., the faces of the core 5 and the armature 8 in opposition).

In general, a fuel injection valve is required to have a high responsiveness. The pressure pulsation generated is a surge (nearly instantaneous) pressure change, and the frequency thereof is high.

Therefore, according to the invention, there is not provided any "Helmholtz resonator of complicated structure that is formed of a volume chamber and an annular gap, being a passage that communicates with this volume chamber" as disclosed in the Japanese Patent No. 3723800, but a branch-type resonator of the simple structure, thereby suppressing the occurrence of differential pressure between the air gap and the resonator.

Thus, according to the invention, it is unnecessary to increase the number of parts or to have a complicated structure; as well as due to the positional effect of a resonator being formed, it is possible to achieve a higher responsiveness, to be provided for improvement in operation speed of the fuel injection valve and the high fuel pressure, and to obtain the advantage of bounce suppression.

Now, the feature and operation of the fuel injection valve according to the first embodiment are further described.

FIG. 2 is an enlarged view of G portion of FIG. 1(*a*).

With reference to FIG. 1 or FIG. 2, numeral 5*a* designates "a tubular cavity acting as a resonator" that is machined in an internal part of the core 5 orthogonally to the end face of the core 5 at the end face of the core 5 opposite to the armature 8.

Additionally, with reference to FIG. 2, "L" is a depth of the tubular cavity 5*a*, and "ϕ" is a bore (diameter) of the tubular cavity 5*a*.

This tubular cavity 5*a* is open only on the end face side of the core 5, and there is no opening or passage from which fuel comes out other than the foregoing opening (that is, it is not a through hole, but a bottomed hole) . Thus, this tubular cavity 5*a* is referred to as "drilled hole" as well.

As mentioned above, the resonator shown in the Japanese Patent No. 3723800 has a complicated structure in which a passage is formed in the space (that is, a gap) where pressure pulsation is desired to be absorbed, and a pressure chamber is disposed in the inner recess of this passage.

On the other hand, the tubular cavity 5*a* acting as a resonator, according to this first embodiment, is merely a straight hole, forming a so-called "branch type" resonator.

As shown in FIG. 1(*b*), the tubular cavity 5*a* acting as a resonator of this branch type is located at the central portion in the radial direction of the annular end face of a core 5, whereby it becomes possible to obtain stable characteristics (that is, bounce suppression characteristics).

According to the first embodiment, as shown in FIG. 2, the gap 30 that is formed between the end face of the core 5 in which the tubular cavity 5*a* is machined and the end face of the armature 8, and the space 31 that is formed between the armature 8 and the stopper 14 are brought in communication through a passage 32.

With reference to FIG. 2, V1 is a volume of the gap 30, V2 is a volume of the space 31, ΔV is a volume variation of V1 and V2 by the valve opening/closing operation of the needle 10, ΔP1 is a pressure change of the volume V1 portion by the valve opening/closing operation of the needle 10, and ΔP2 is a pressure change of the volume V2 portion by the valve opening/closing operation of the needle 10.

In the case of no resonator, as described above, bounce is made larger due to the occurrence of ΔP1 and ΔP2.

However, according to this first embodiment, ΔP1 can be made smaller by the provision of a resonator (for example, a tubular cavity 5*a*), so that the bounce of the needle 10 is relieved, resulting in reduction of bounce amount.

Due to the nature of the product (i.e., a fuel injection valve), there is a relationship of $V1 \leqq v2$, so that $\Delta P1 \geqq \Delta P2$.

Furthermore, a resonance frequency "f" of a general branch-type resonator is obtained with the following expression:

$$f=[(2n-1)/4L]*C$$

where:

f is a resonance frequency Hz, n is an integer (1, 2, 3 . . . ),

L is a branch tube depth m, and

C is a fuel propagation velocity m/s.

As shown in the above expression, a resonance frequency "f" is set only with a depth of a branch tube (tubular cavity), so that a simple drilled hole can be sufficient as the branch tube.

Thus, it is possible to suppress the increase in cost.

Furthermore, although hole diameter (bore) of the branch tube is of any size, it is possible to obtain larger bounce suppression effect, as hole diameter is made larger.

Figure 3:
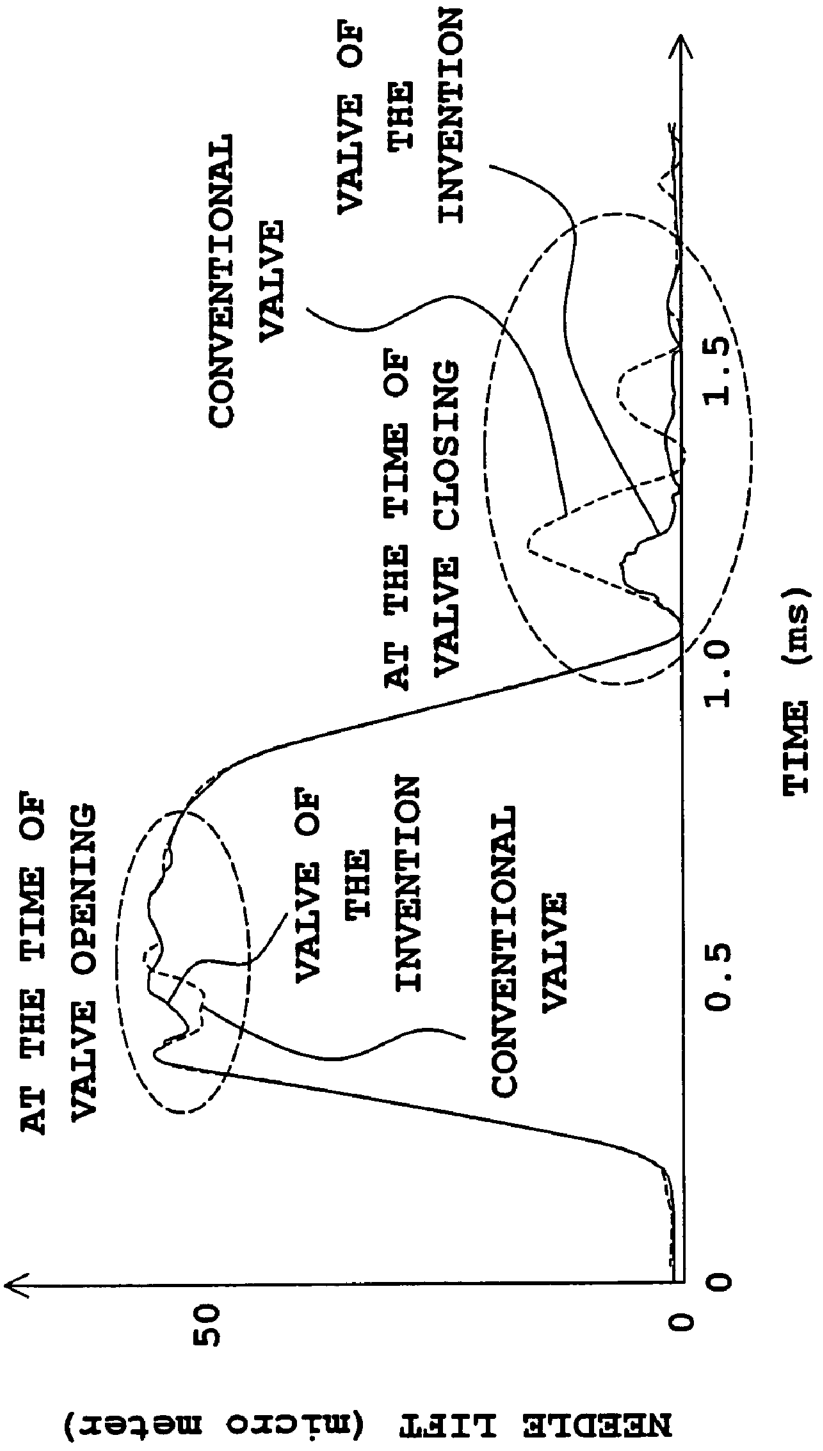
FIG. 3 is a chart showing bounce suppression effects of the fuel injection valve according to the first embodiment.

FIG. 3 is a chart showing bounce waveforms of needles that take place at the time of operation of the conventional valve (fuel injection valve according to the prior art) without any mechanism of suppressing bounce at all, and the fuel injection valve according to the invention.

As is understood from the chart, in contrast to the conventional valve, bounce when using the valve according to the invention (fuel injection valve according to the first embodiment) is found suppressed at the time of both vale opening and valve closing.

In particular, the fuel injection valve according to this first embodiment has a large bounce suppression effect at the time of valve closing.

Additionally, although the case of a tubular cavity 5*a* is taken as an example in the above description, configuration of a cavity 5*a* is not limited to the tube-shape.

Further, although a tubular cavity 5*a* is machined in the internal part of the core 5 orthogonally to the end face of the core 5 at the end face of the core 5 opposite to the armature 8, it is preferable to be a tubular cavity 5*a* that is not orthogonal to the end face of the core 5, but is inclined to some extent.

As described above, a fuel injection valve according to this first embodiment comprises: a solenoid unit 2 that includes a core 5, an armature 8 and a coil 6; and a valve unit 9 that includes a valve element 10 connected to the armature 8 to travel therewith, and a valve seat 12 that regulates a movement in valve closing direction of the valve element 10, as well as is open and closed by the valve element 10 separating from or coming in contact with said valve seat, and a stopper 14 for regulating a movement in valve opening direction of the valve element 10; and that is connected to the solenoid unit 2; and in which there is provided a cavity that communicates with a gap 30 formed between the core 5 and the armature 8 in opposition, and this cavity forms a resonator for suppressing bounce of the valve element 10.

According to this first embodiment, there is not formed any conventional "resonator of the complicated structure in which a passage is formed in the space (gap) where desirably pressure pulsation is absorbed, and a volume chamber is disposed in the inner recess of this passage", but there is formed a resonator for suppressing the bounce of the needle in which a cavity (for example, a tubular cavity) that communicates with the gap formed between a core and an armature in opposition is provided. As a result, the number of parts is not increased, as well as the structure is simple, resulting in superior productivity.

Further, the resonator is positioned in the vicinity of the gap where desirably pressure pulsation is absorbed, so that it is possible to achieve a high responsiveness to the valve opening/closing operation, to be provided for improvement in operation speed of the fuel injection valve and high fuel pressure, as well as to obtain the advantage of bounce suppression.

Furthermore, in the fuel injection vale according to the first embodiment, there is formed a space 31 between the armature 8 and the stopper 14; and this space 31 and the gap 30 communicate with a fuel passage, and are filled with fuel at all times even if the valve unit 9 is in valve opening/closing operation.

As a result, even if the valve unit 9 makes the valve opening/closing operation, it is possible to effectively suppress bounce of the valve element 10 at all times.

Moreover, the cavity of the fuel injection valve according to the first embodiment is formed in an internal part of the core 5 orthogonally to the face of the core 5 opposite to the armature 8.

As the volume of the core 5 is larger than the volume of the armature 8, it is possible to make the volume of a cavity larger to enhance pulsation suppression effect.

Furthermore, the cavity of the fuel injection valve according to the first embodiment is a tubular cavity 5*a* of simple structure being a drilled hole (that is, bottomed hole).

Consequently, it is possible to form a cavity easily with high workability.

Embodiment 2

Figure 4:
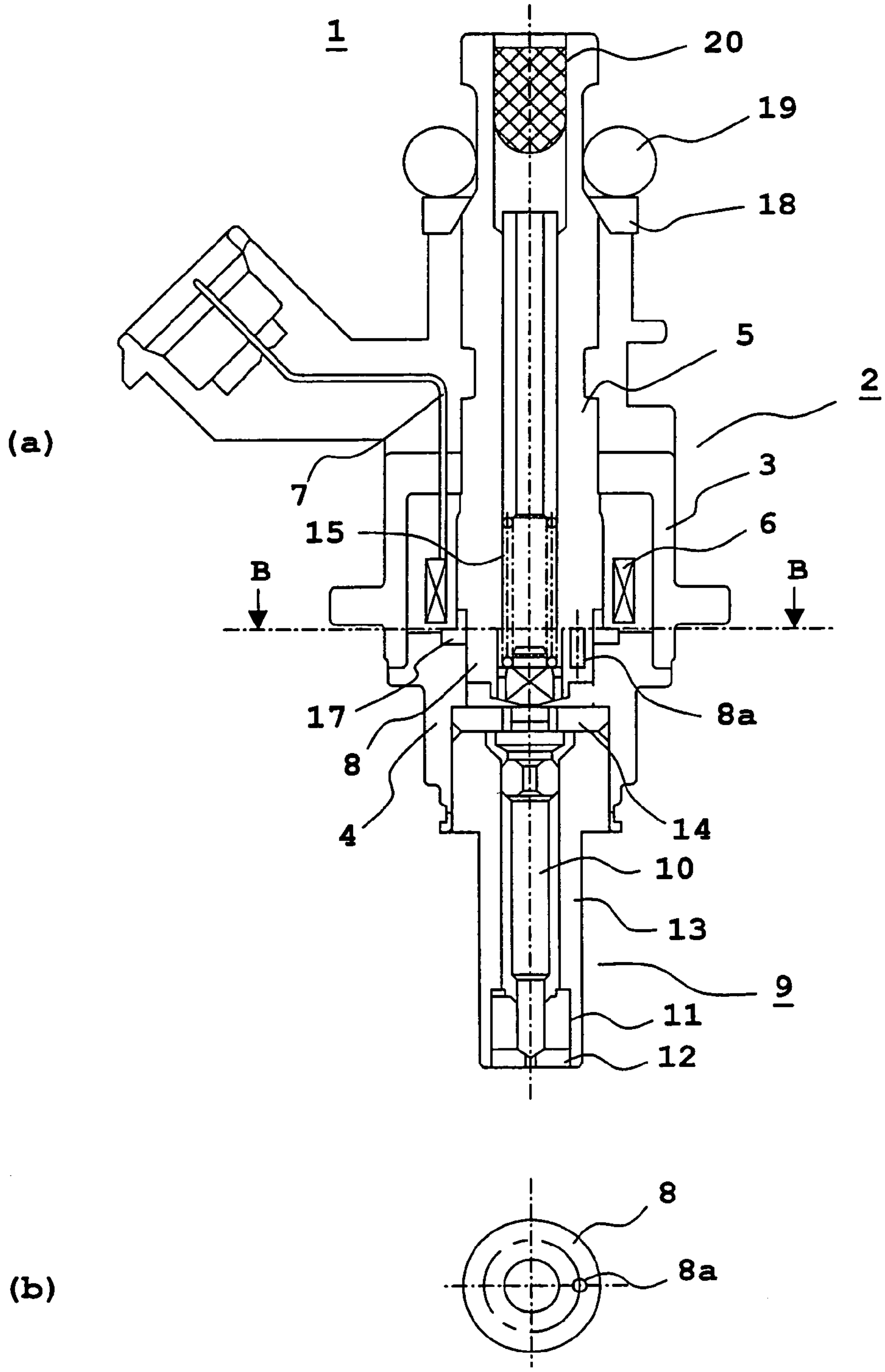
FIGS. 4(*a*) and (*b*) are views each showing a structure of a fuel injection valve according to a second embodiment.

FIG. 4 is a view showing a structure of a fuel injection valve according to a second embodiment of the invention.

FIG. 4(*a*) shows the entire structure of the fuel injection valve according to the second embodiment, and FIG. 4(*b*) shows the end face of an armature taken along line B-B of FIG. 4(*a*).

With reference to FIG. 4, numeral 8*a* is "tubular cavity acting as a resonator" that is machined in an internal part of the armature 8 orthogonally to the end face of the armature 8 at the end face of the armature 8 opposite to the core 5.

The fuel injection valve according to this second embodiment is characterized in that a tubular cavity acting as a resonator for suppressing bounce of the needle 10 is formed on the armature side.

According to the second embodiment, due to such construction, in the same manner as in the case of the foregoing first embodiment, it is possible to suppress the bounce of the needle 10.

Further, due to the fact that a tubular cavity acting as a resonator is formed in the armature 8, being a moving part, the weight of the armature 8 is reduced, so that a higher responsiveness of the needle 10 (that is, higher responsiveness of the fuel injection valve) is achieved.

The armature 8 is smaller than a core 5, however, the depth of the tubular cavity 8*a* is limited as compared with the foregoing first embodiment, and the volume thereof may be smaller.

Accordingly, the fuel injection valve according to the second embodiment is preferably applied to the case where pressure pulsation in high frequency region is desired to be absorbed.

As described above, the cavity of the fuel injection valve according to this second embodiment is formed in the internal part of the armature 8 orthogonally to the face of the armature 8 opposite to the core 5.

As a result, since the tubular cavity acting as a resonator is formed in the internal part of the armature 8, the weight of the armature 8 is reduced, so that higher responsiveness of the fuel injection valve is achieved.

Embodiment 3

Figure 5:
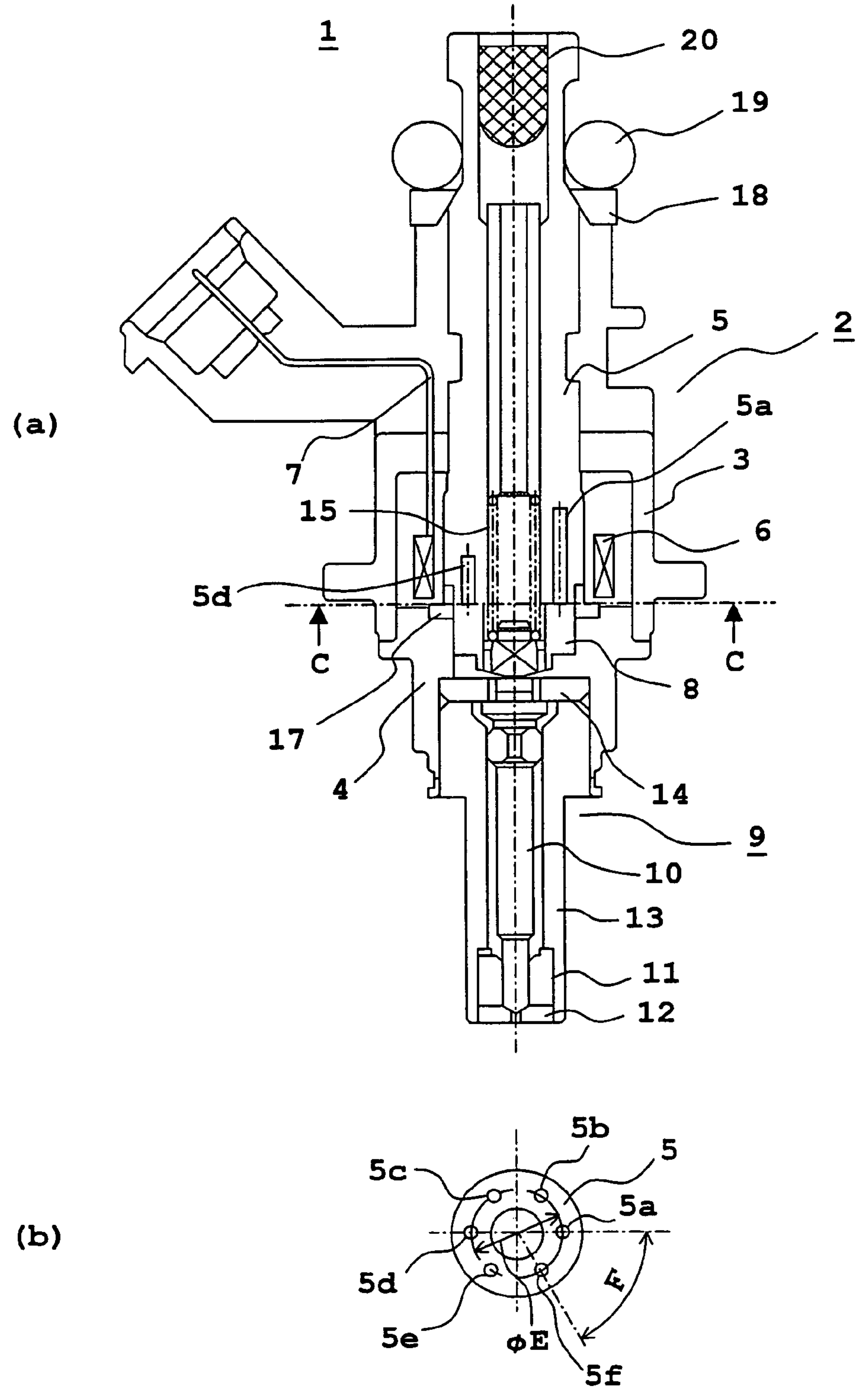
FIGS. 5(*a*) and (*b*) are views each showing a structure of a fuel injection valve according to a third embodiment.

FIG. 5 is a view showing a structure of a fuel injection valve according to a third embodiment of the invention.

FIG. 5(*a*) shows the entire structure of the fuel injection valve according to the third embodiment, and FIG. 5(*b*) shows the end face of a core taken along line C-C of FIG. 5(*a*).

According to the foregoing first embodiment, one tubular cavity is formed in the internal part of the core 5 orthogonally to the end face of the core 5 at the end face of the core 5 opposite to the armature 8.

On the other hand, the fuel injection valve according to this third embodiment is characterized in that a plurality of tubular cavities are formed in the internal part of the core 5 orthogonally to the end face of the core 5 at the end face of the core 5 opposite to the armature 8.

With reference to FIG. 5, numerals 5*a*, 5*b*, . . . 5*f* designate tubular cavities that are formed in the internal part of the core 5 orthogonally to the end face of the core 5.

In the case of one tubular cavity as in the foregoing first embodiment, since, at the end face of the armature 8, there are unevenly formed points at which pressure pulsation is suppressed and points at which pressure pulsation is not suppressed, the pressure to exert on the armature 8 comes to be uneven. Thus, the movement of a needle 10 at the time of valve opening/closing becomes unstable.

To cope with this, by forming a plurality of tubular cavities equally spaced at the end face of the armature 8, the pressure to exert on the end face of the armature 8 comes to be even, resulting in stable movement of the needle 10.

Furthermore, the total cross sectional area of the cavities becomes larger, and the volume of the cavities becomes larger as well, so that larger pulsation suppression effect is achieved.

In addition, an example in which six tubular cavities are formed on the core 5 side is shown in FIG. 5. However, the number of cavities not limited to six, and it is preferable to adopt any other number of tubular cavities.

Further, as shown in FIG. 5, it is preferable that the plurality of tubular cavities 5*a*, 5*b*, . . . 5*f* are not always to be of the same depth, but be of different depths when required.

By causing the depths of tubular cavities to be different, it is possible to extend the frequency band of pressure pulsation to be absorbed.

Moreover, as shown in FIG. 5(*b*), it is desirable that a plurality of tubular cavities is formed at regular pitches at the central portion of the annular end face of the core 5.

In addition, with reference to FIG. 5(*b*), "$\phi$E" is a diameter of an annular ring, which a plurality of tubular cavities form, and "F" is a pitch between the tubular cavities.

As described above, in the fuel injection valve according to this third embodiment, there are provided a plurality of cavities to be formed in an internal part of the core 5.

As a result, the pressure to exert on the end face of the armature 8 comes to be substantially even. Thus, the movement of the needle 10 at the time of valve opening/closing becomes stable, as well as pulsation suppression effect come to be larger.

Further, the plurality of cavities to be formed in an internal part of the core 5 is tubular cavities 5*a*, 5*b* . . . with different diameters and depths respectively. As a result, the movement of a needle 10 at the time of valve opening/closing domes to be stable, as well as it is possible to manufacture with high workability a fuel injection valve having large pulsation suppression effect.

Furthermore, the plurality of tubular cavities is disposed at regular intervals substantially at the central portion of the annular end face where the core and the armature are opposed. As a result, the pressure to exert on the end face of the armature 8 becomes further even, and thus the movement of the needle at the time of valve opening/closing comes to be stable all the more.

Embodiment 4

Figure 6:
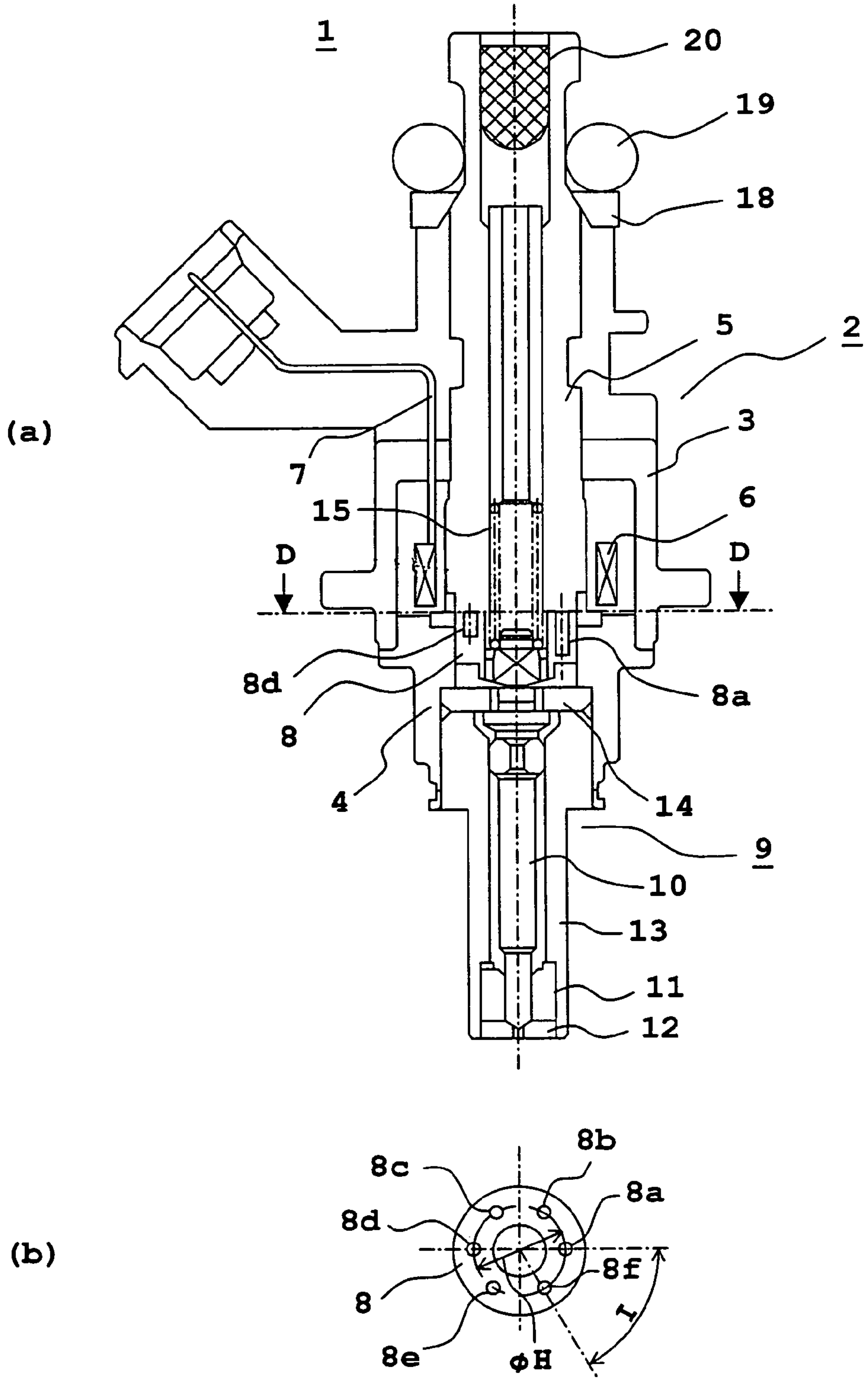
FIGS. 6(*a*) and (*b*) are views each showing a structure of a fuel injection vale according to a fourth embodiment.

FIG. 6 is a view showing a structure of a fuel injection valve according to a fourth embodiment.

Furthermore, FIG. 6(*a*) shows the entire structure of a fuel injection valve according to the fourth embodiment, and FIG. 6(*b*) shows the end face of a core taken along line D-D of FIG. 6(*a*).

According to the foregoing second embodiment, there is formed one tubular cavity in the internal part of the armature 8 orthogonally to the end face of the armature 8 at the end face of the armature 8 opposite to the core 5.

The fuel injection valve according to this fourth embodiment is characterized in that, at the end face of an armature 8 opposite to a core 5, a plurality of tubular cavities are formed in the internal part of the armature 8 orthogonally to the end face of the armature 8.

With reference to FIG. 6, numerals 8*a*, 8*b*, . . . 8*f* designate the plurality of tubular cavities that are formed in the internal part of the armature 8 orthogonally to the end face of the armature 8.

As described in the foregoing third embodiment, in the case of one tubular cavity, since, at the end face of the armature 8, there are unevenly formed points at which pressure pulsation is suppressed and points at which pressure pulsation it not suppressed, the pressure to exert on the armature 8 comes to be uneven. Thus, the movement of a needle 10 becomes unstable.

To cope with this, by forming a plurality of tubular cavities equally spaced at the end face of the armature 8, the pressure to exert on the end face of the armature 8 comes to be even, resulting in stable movement of the needle 10.

Further, the total cross sectional area of the cavities becomes larger, and the volume of the cavities becomes larger as well, so that larger pulsation suppression effect is achieved.

In addition, an example in which six tubular cavities are formed on the core 5 side is shown in FIG. 5. However, the number of cavities is not limited to six, and it is preferable to adopt any other number of tubular cavities.

Further, as shown in FIG. 6, it is preferable that the plurality of tubular cavities 8*a*, 8*b*, . . . 8*f* are not always to be of the same depth, but be of different depths when required.

By causing the depths of the tubular cavities to be different, it is possible to extend the frequency band of pressure pulsation to be absorbed.

Moreover, as shown in FIG. 6(*b*), it is desirable that the plurality of tubular cavities is formed at regular pitches at the central portion of the annular end face of the armature.

In addition, with reference to FIG. 8(*b*), "ϕH" is a diameter of an annular ring, which the plurality of tubular cavities forms, and "I" is a pitch between the tubular cavities.

As described above, in the fuel injection valve according to this third embodiment, there are provided a plurality of cavities to be formed in an internal part of the core 5.

As a result, the pressure to exert on the end face of the armature 8 comes to be substantially even. Thus, the movement of the needle 10 at the time of valve opening/closing becomes stable, as well as pulsation suppression effect come to be larger.

Further, the plurality of cavities to be formed in an internal part of the armature 8 is tubular cavities 8*a*, 8*b* . . . with different diameters and depths respectively. As a result, the movement of a needle 10 at the time of valve opening/closing comes to be stable, as well as it is possible to manufacture with high workability a fuel injection valve having large pulsation suppression effect.

Furthermore, the plurality of tubular cavities is disposed at regular intervals substantially at the central portion of the annular end face where the core and the armature are opposed. As a result, the pressure to exert on the end face of the armature 8 becomes further even, and thus the movement of the needle at the time of valve opening/closing comes to be stable all the more.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A fuel injection valve comprising:

a solenoid unit that includes a core, an armature and a coil;

a valve unit that includes a valve element connected to said armature to travel therewith, and a valve seat that regulates a movement in valve closing direction of said valve element, as well as is open and closed by said valve element separating from or coming in contact with said valve seat, and a stopper for regulating a movement in valve opening direction of said valve element, said valve unit being connected to said solenoid unit;

wherein there is provided a cavity that is at, and that is in communication with, a gap formed between said core and said armature in opposition, and said cavity forms a resonator for suppressing bounce of said valve element;

wherein said cavity is formed in an internal part of said armature orthogonally to the face of said armature opposite said core, and wherein said cavity is a bottomed tubular cavity.

2. A fuel injection valve comprising:

a solenoid unit that includes a core, an armature and a coil;

a valve unit that includes a valve element connected to said armature to travel therewith, and a valve seat that regulates a movement in valve closing direction of said valve element, as well as is open and closed by said valve element separating from or coming in contact with said valve seat, and a stopper for regulating a movement in valve opening direction of said valve element, said valve unit being connected to said solenoid unit;

wherein there is provided a cavity that is at, and that is in communication with, a gap formed between said core and said armature in opposition, and said cavity forms a resonator for suppressing bounce of said valve element, wherein said cavity is formed in an internal part of said core orthogonally to the face of said core opposite to said armature;

wherein there are formed a plurality of cavities in the internal part of said core, and wherein each of said cavities is a bottomed tubular cavity.

3. A fuel injection valve comprising:

a solenoid unit that includes a core, an armature and a coil;

a valve unit that includes a valve element connected to said armature to travel therewith, and a valve seat that regulates a movement in valve closing direction of said valve element, as well as is open and closed by said valve element separating from or coming in contact with said valve seat, and a stopper for regulating a movement in valve opening direction of said valve element, said valve unit being connected to said solenoid unit;

wherein there is provided a cavity that is at, and that is in communication with, a gap formed between said core and said armature in opposition, and said cavity forms a resonator for suppressing bounce of said valve element;

wherein said cavity is formed in an internal part of said armature orthogonally to the face of said armature opposite said core;

wherein there are formed a plurality of cavities in the internal part of said armature, and wherein each of said cavities is a bottomed tubular cavity.

4. A fuel injection valve comprising:

a solenoid unit that includes a core, an armature and a coil; and a valve unit that includes a valve element connected to said armature to travel therewith, and a valve seat that regulates a movement in valve closing direction of said valve element, as well as is open and closed by said valve element separating from or coming in contact with said valve seat, and a stopper for regulating a movement in valve opening direction of said valve element, said valve unit being connected to said solenoid unit;

wherein there is provided a cavity that is at, and that is in communication with, a gap formed between said core and said armature in opposition, and said cavity forms a resonator for suppressing bounce of said valve element;

wherein said cavity is formed in an internal part of said core orthogonally to the face of said core opposite to said armature;

wherein there are formed a plurality of cavities in the internal part of said core;

wherein the plurality of cavities to be formed in the internal part of said core are bottomed tubular cavities including different diameters and depths respectively.

5. The fuel injection valve according to claim 4, wherein the plurality of bottomed cavities are disposed at regular intervals substantially at the central portion of an annular end face where the core and the armature are opposed.

6. A fuel injection valve comprising:

a solenoid unit that includes a core, an armature and a coil; and a valve unit that includes a valve element connected to said armature to travel therewith, and a valve seat that regulates a movement in valve closing direction of said valve element, as well as is open and closed by said valve element separating from or coming in contact with said valve seat, and a stopper for regulating a movement in valve opening direction of said valve element, said valve unit being connected to said solenoid unit;

wherein there is provided a cavity that is at, and that is in communication with, a gap formed between said core and said armature in opposition, and said cavity forms a resonator for suppressing bounce of said valve element, wherein said cavity is formed in an internal part of said armature orthogonally to the face of said armature opposite said core, and wherein there are formed a plurality of cavities in the internal part of said armature, and wherein the plurality of cavities to be formed in the internal part of said armature are bottomed tubular cavities including different diameters and depths respectively.

7. The fuel injection valve according to claim 6, wherein the plurality of bottomed cavities are disposed at regular intervals substantially at the central portion of the annular end face where the core and the armature are opposed.

8. A fuel injection valve comprising:

a solenoid unit that includes a core, an armature and a coil; and a valve unit that includes a valve element connected to said armature to travel therewith, and a valve seat that regulates a movement in valve closing direction of said valve element, as well as is open and closed by said valve element separating from or coming in contact with said valve seat, and a stopper for regulating a movement in valve opening direction of said valve element, said valve unit being connected to said solenoid unit, and wherein there is provided a cavity that is at, and that is in communication with, a gap formed between said core and said armature in opposition, and said cavity forms a resonator for suppressing bounce of said valve element, and wherein said cavity is a bottomed tubular cavity, and wherein said core and said armature have axes which extend in an axial direction and are in axial alignment, and wherein said tubular cavity comprises at least one bore hole which extends within said core and parallel to said axes.

* * * * *